(12) United States Patent
Kology

(10) Patent No.: US 6,318,411 B1
(45) Date of Patent: Nov. 20, 2001

(54) PROJECTILE RECEIVER FOR DUCT PIPE TESTING

(76) Inventor: Keith Kology, 1208 Tuxedo Pl., Spring Lake Heights, NJ (US) 07762

( * ) Notice: Subject to any disclaimer, the term of this patent is extended or adjusted under 35 U.S.C. 154(b) by 0 days.

(21) Appl. No.: 09/742,358

(22) Filed: Dec. 22, 2000

(51) Int. Cl.[7] .................................................. F16L 9/00
(52) U.S. Cl. .......................... 138/155; 138/177; 138/178
(58) Field of Search .................................. 138/177, 178, 138/109, 155

(56) References Cited

U.S. PATENT DOCUMENTS

| | | | |
|---|---|---|---|
| 379,890 | 3/1888 | Givens | 406/179 |
| 2,311,797 | 2/1943 | Wright | 406/83 |
| 3,111,171 | * 11/1963 | Farrrar et al. | 138/96 T X |
| 3,332,724 | 7/1967 | Doucet | 406/82 |
| 3,945,682 | 3/1976 | Hoagland et al. | 406/62 |
| 4,971,481 | 11/1990 | Foreman | 406/15 |
| 5,127,773 | 7/1992 | Foreman et al. | 406/179 |
| 5,913,338 | * 6/1999 | Bettenhausen | 138/177 |
| 6,045,299 | 4/2000 | van Kessel et al. | 406/86 |

* cited by examiner

Primary Examiner—Patrick Brinson
(74) Attorney, Agent, or Firm—Arnold D. Litt

(57) ABSTRACT

A projectile receiver for receiving and stopping a high velocity projectile used in testing duct pipe which serves as a housing for fiber optic cables, as well as a method of using the projectile receiver, are disclosed. The receiver has a perforated housing that contains a rubber end stop therein adjacent a removable cap. The opposite end of the housing is stepped down to a diameter equal to that of a duct pipe being tested. The projectile receiver may be quickly and easily attached to and detached from a duct pipe to be tested using a clamping device, so that a single projectile receiver can be used to test a plurality of duct pipes in succession.

19 Claims, 1 Drawing Sheet

PROJECTILE RECEIVER FOR DUCT PIPE TESTING

BACKGROUND OF THE INVENTION

1. Field of the Invention

The invention relates to a projectile receiving system for use in testing the integrity of a duct pipe serving as a housing for fiber optic cables. More particularly, the invention relates to a projectile receiver selectively attached to the terminal end of a duct pipe for safely receiving (and subsequently removing therefrom) a projectile that has been forced through the duct pipe under high pressure. The invention also relates to a method of using the device.

2. Description of the Prior Art

In the optical fiber industry, small diameter, high-density polyethylene plastic pipes are used as conduits or ducts for housing optical fibers. These duct pipes usually run for many miles, and either lay in bundles in a trench or are aggregated within a larger pipe. Optical fibers are subsequently positioned within these previously placed duct pipes.

It, therefore, becomes critical that the length of pipe be continuous and unobstructed such that there is no interference with the optical fibers as they are inserted within the duct pipes. The pipes are, therefore, tested prior to installing the optical fibers therein. Pipes are currently tested for continuity and lack of obstructions by passing a projectile, or "bird", having approximately the same diameter as the optical fiber through the pipe.

Specifically, the bird is placed in a first end of the pipe under high pressure of approximately 375 cfm. Under this high pressure and the force it exerts, the projectile, or bird, moves at high velocity through the pipe. Assuming the projectile reaches the terminal end of the pipe unencumbered, clear evidence is provided that the pipe is continuous and straight.

Such tests are performed every mile or so where a manhole, or a hand hole, is provided for accessing the pipe line. In practice, the projectile is inserted in one manhole (or hand hole) and exits at the next manhole (or hand hole) a mile or so away. This process is then repeated throughout the length of the pipe. Given the high speed of the projectile as it passes through the pipe, it is important to provide a safe system for stopping the projectile as it exits the duct pipe so that it does not cause damage to property or person.

The prior art addresses this problem by using things such as bales of hay situated near the manhole (or hand hole) opening. Upon exiting the duct pipe, the projectile impacts the hay bales, which impact is supposed to stop the flight of the projectile. The reality, however, is that the projectile often ricochets off the hay bales and causes damage during its wayward flight, both to property and to the body of the person overseeing the testing process.

As such, a need exists for a reliable, convenient and effective system for receiving, stopping and retrieving a high velocity projectile used in testing duct pipes. The projectile must be stopped in a safe manner and must be available for retrieval from the receiving device. The receiving device should be easily attached to and removed from the pipe being tested so it can be moved quickly from one pipe being tested to the next.

SUMMARY OF THE INVENTION

It is, therefore, an object of the present invention to provide a projectile receiver for receiving a projectile from a terminal end of a section of duct pipe being tested. The receiver includes a first section having a first tube with a first inner diameter, wherein the first tube has first and second ends. The receiver further includes a cap releasably secured to the first end of the first tube. The cap has a resilient, compressible end stop secured thereto and received within the first tube when the cap is secured to the first tube. The receiver also includes a second section composed of an apertured second tube having an inner diameter, wherein the second section has first and second ends, and the first end of the apertured second tube is coupled to the second end of the first tube. The receiver further includes a third section having a third tube with first and second ends, wherein the first end of the third tube is coupled to the second end of the apertured second tube and the second end of the third tube is shaped and dimensioned for selective coupling to a duct pipe.

It is also an object of the present invention to provide a method for testing fiber optic pipes with the receiver disclosed above.

Other objects and advantages of the present invention will become apparent from the following detailed description when viewed in conjunction with the accompanying drawings, which set forth certain embodiments of the invention.

DESCRIPTION OF THE PREFERRED EMBODIMENT

The detailed embodiment of the present invention is disclosed herein. It should be understood, however, that the disclosed embodiment is merely exemplary of the invention, which may be embodied in various forms. Therefore, the details disclosed herein are not to be interpreted as limited, but merely as the basis for the claims and as a basis for teaching one skilled in the art how to make and/or use the invention.

Figure 1:
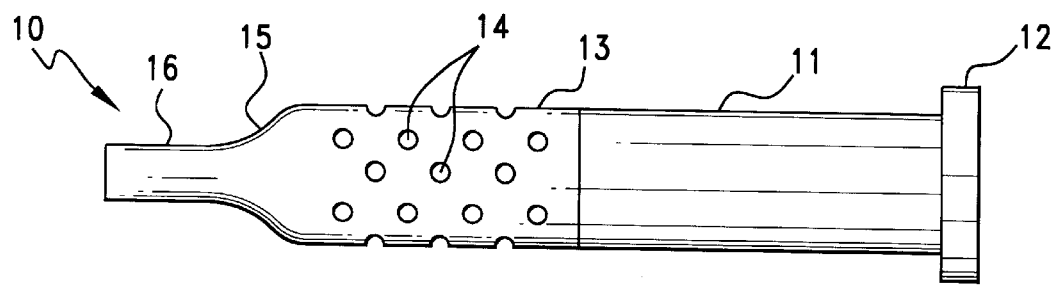
FIG. 1 is a side view of the projectile receiver of the invention.

With reference to FIG. 1, a projectile receiver 10 is disclosed. The receiver 10 includes a first section having a solid-walled metal first tube 11 with a cap 12 on a first end thereof According to a preferred embodiment, the metal first tube 11 is made of steel, although those skilled in the art will appreciate the variety of materials from which the first tube may be manufactured without departing from the spirit of the present invention.

The second end of the solid-walled first tube 11 is attached to a first end of an apertured second tube 13. The apertured second tube 13 has a plurality of apertures 14 throughout its circumference. The apertured second tube 13 constitutes a second section of the receiver 10. According to a preferred embodiment, the apertured second tube 13 is manufactured from plastic, specifically, high-density polyethylene. While specific materials are disclosed for the first and second sections of the projectile receiver of the invention, other materials may be utilized without departing from the spirit of the present invention.

The solid-walled first tube 11 and the apertured second rube 13, which have substantially the same inner diameters as one another, are preferably joined by glue. However, it will be understood by those of ordinary skill in the art that the tubes could be joined by any other suitable means and still remain within the scope of the invention. As such, it is contemplated that a mechanical joiner comprising detents and slots may be a suitable alternate joining structure for use in accordance with the spirit of the present invention.

The opposite end of the apertured second tube 13 is welded, or otherwise coupled, to a solid-walled third tube 16 which is subsequently connected to a step-down flange 15. The solid-walled third tube 16 and step down flange 15 form a third section of the present receiver 10. The step-down flange 15 brings down the inner diameter of the receiver 10 to equal the inner diameter of a duct pipe to be tested.

It should be understood that the step down flange 15, or reducer, is it's own separate piece of material. It is sized inside and outside to match second tube 13 and third tube 16 exactly. In accordance with a preferred embodiment of the present invention, butt fusion is used to couple the various components. A hot metal iron is used to heat each side of the reducer 15 and the matching sides of the tubes 16 and 13. These butt fusions are done individually and are pushed together while the fusion of the high density polyethylene takes place. As with the other coupled members discussed above, a preferred coupling techniques is disclosed herein in accordance with a preferred embodiment of the present invention and various coupling techniques may be employed without departing from the spirit of the present invention.

Figure 2:
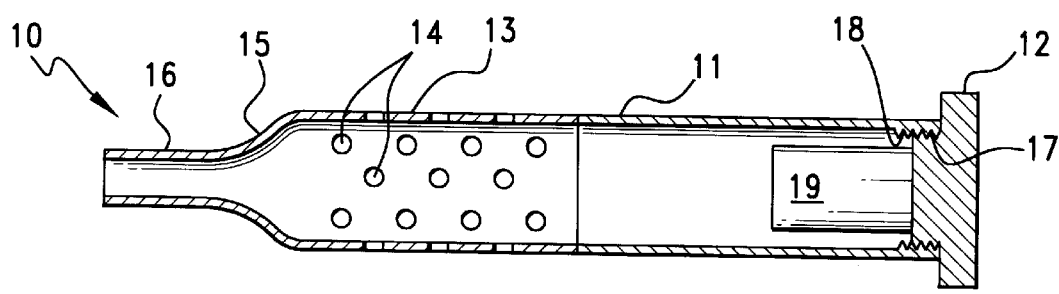
FIG. 2 is a cross-sectional view of the projectile receiver of FIG. 1.

With reference to FIG. 2, it can be seen that the cap 12 is removably mounted on the end of the solid-walled first tube 11 via screw threads, with internal threads 18 on the solid-walled first tube 11 and external threads 17 on the cap 12. Alternatively, the threading arrangement could be reversed with the cap 12 having internal threads and the solid-walled first tube 11 having external threads. Additionally, any other means of attachment that would securely fix the cap 12 on the first tube 11 while allowing the cap 12 to be quickly and easily removed and reattached would also be an acceptable alternative to the arrangement shown.

Located within the solid-walled first tube 11 and adhesively attached to the cap 12 is a relatively soft, resilient, compressible end stop 19 for absorbing the impact of the projectile 26 as it is stopped by the receiver 10. While rubber is one suitable material for the end stop 19, those of ordinary skill in the art will understand that many other soft, resilient and compressible materials could be used as well.

Figure 3:
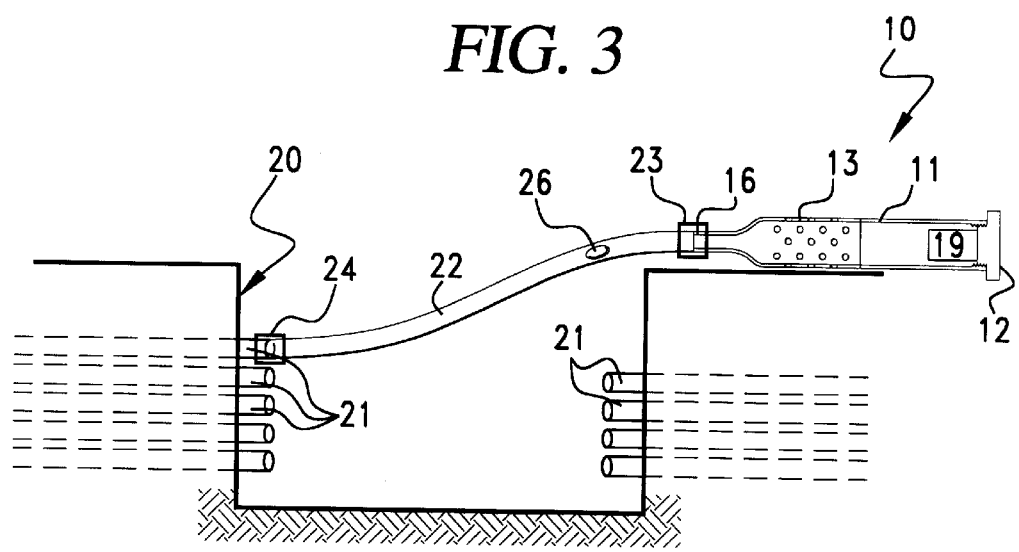
FIG. 3 is a cross-sectional view of the projectile receiver of the invention attached to a section of duct pipe and ready for use.

FIG. 3 shows the projectile receiver 10 of the invention set up and ready for use. As can be seen in FIG. 3, a plurality of duct pipes 21, which will each serve to house a fiber optic cable, are buried, and their ends are accessible via the opening of a manhole or hand hole 20. The solid-walled third tube 16 of the projectile receiver 10 is connected to one of the duct pipes 21. In the arrangement shown, a connecting tube 22, having an inner diameter equal to that of both the duct pipe 21 and the solid-walled third tube 16, is placed so that one end of connecting tube 22 abuts the end of the solid-walled third tube 16, and the other end of the connecting tube 22 abuts the terminal end of the section of duct pipe 21 to be tested. At each of these abutments, a clamping member 23, 24 is placed over the ends of the two abutting tubes to join them exactly and securely. It will be clear to one of ordinary skill in the art that alternative arrangements for connecting the projectile receiver 10 to the duct pipe 21 may be utilized without departing from the spirit of the invention. Such alternative arrangements include, but are not limited to, direct abutment of the solid-walled third tube 16 to the duct pipe 21, as well as clamping of the third tube 16 and pipe 21.

In practice, when testing a section of duct pipe 21 both ends of the duct pipe section to be tested are accessed via manholes or hand holes 20. The solid-walled third tube 16 of the projectile receiver 10 of the invention is secured to the terminal end of the duct pipe 21, either directly or indirectly. The cap 12 of the receiver 10 is secured onto the end of the solid-walled first tube 11. A projectile 26, which is generally an aluminum slug having a diameter approximately equal to the diameter of the fiber optic cable to be inserted in the duct pipe 21, is placed in the first end of duct pipe 21 under high pressure, typically approximately 375 cfm.

Assuming the duct pipe 21 is continuous and unobstructed, the projectile 26 proceeds at high speed from the first end, through the terminal end and into the projectile receiver 10. As the projectile 26 approaches and enters the projectile receiver 10, air is forced through the apertures 14 in apertured tube 13. The passage of air in this way serves to slow the progress of the projectile 26. The projectile 26 impacts end stop 19, which absorbs the impact of the projectile 26 and brings it to a stop. The cap 12 is then removed from the first solid-walled tube 11 and the projectile 26 is removed. The projectile receiver 10 is separated from the duct pipe 21 and the entire process is repeated on additional sections of duct pipe 21 until the entire length of the duct pipe line is tested.

The ability of the present projectile receiver 10 to be quickly and easily attached to and separated from the duct pipe 21 allows the testing of the duct pipe 21 to be both safe and efficient. By using the present projectile receiver 10, the potential for the projectile 26 to cause damage to person or property upon exiting the tested duct pipe 21 is substantially eliminated.

While the preferred embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. A projectile receiver for receiving a projectile from a terminal end of a section of duct pipe being tested, comprising:

a first section including a first tube having a first inner diameter, the first tube having first and second ends;

a cap releasably secured to the first end of the first tube, the cap having a resilient, compressible end stop secured thereto and received within the first tube when the cap is secured to the first tube;

a second section composed of an apertured second tube having an inner diameter, the second section having first and second ends, wherein the first end of the apertured second tube is coupled to the second end of the first tube;

a third section including a third tube having first and second ends, the first end of the third tube being coupled to the second end of the apertured second tube and the second end of the third tube being shaped and dimensioned for selective coupling to a duct pipe.

2. The projectile receiver according to claim 1, wherein the second end of the third tube has an inner diameter smaller than that of the first tube and the apertured second tube.

3. The projectile receiver of claim 1, wherein the first tube and the apertured second tube are adhesively joined.

4. The projectile receiver of claim 1, wherein the third tube is a step-down flange producing a second end having a smaller diameter than the first end thereof.

5. The projectile receiver of claim 1, wherein the end stop is made of rubber.

6. The projectile receiver of claim 1, wherein the cap is releasably secured to the first tube by way of screw threads.

7. The projectile receiver of claim 6, wherein the cap is externally threaded and the first tube is internally threaded.

8. The projectile receiver of claim 6, wherein the cap is internally threaded and the first tube is externally threaded.

9. The projectile receiver of claim 1, wherein the first tube is manufactured from metal.

10. The projectile receiver of claim 9, wherein the metal is steel.

11. The projectile receiver of claim 1, wherein the apertured second tube is manufactured from plastic.

12. The projectile receiver of claim 11, wherein the plastic is high-density polyethylene.

13. The projectile receiver of claim 1, wherein the apertured second tube contains a plurality of apertures located throughout the circumference thereof.

14. The projectile receiver of claim 1, wherein the first tube is a solid-walled tube.

15. The projectile receiver of claim 1, wherein the third tube is a solid-walled tube.

16. A method of testing a section of duct pipe for continuity and lack of obstruction using a projectile receiver including a first section including a first tube having a first inner diameter, the first tube having first and second ends; a cap releaably secured to the first end of the first tube, the cap having a resilient, compressible end stop secured thereto and received within the first tube when the cap is secured to the first tube; a second section composed of an apertured second tube having an inner diameter, the second section having first and second ends, wherein the first end of the apertured second tube is coupled to the second end of the first tube; a third section including a third tube having first and second ends, the first end of the third tube being coupled to the second end of the apertured second tube and the second end of the third tube being shaped and dimensioned for selective coupling to a duct pipe; the method comprising the following steps:

securing the second end of the third tube to a terminal end of a section of a duct pipe having an inner diameter substantially equal to the inner diameter of the third tube, the cap of the projectile receiver being secured to the first tube of the projectile receiver;

placing, under pressure, a projectile in a first end of the section of duct pipe to be tested;

receiving the projectile in the projectile receiver;

removing the projectile from the projectile receiver; and detaching the projectile receiver from the section of duct pipe.

17. The method of claim 16, wherein the securing step comprises securing the second end of the second solid-walled tube in abutting relation with the section of duct pipe.

18. The method of claim 16, wherein the securing step includes clamping the second end of the third tube to the section of duct pipe.

19. The method of claim 16, wherein the placing step comprises placing the projectile in the first end of the section of duct pipe under approximately 375 cfm. of pressure.

* * * * *